United States Patent [19]

Lukits

[11] 4,229,887
[45] Oct. 28, 1980

[54] UNIVERSAL ELECTRICAL CONSTRUCTION SET

[76] Inventor: John J. Lukits, 1843 6th St., Manhattan Beach, Calif. 90266

[21] Appl. No.: 947,202

[22] Filed: Sep. 29, 1978

[51] Int. Cl.³ .................................................. G09B 23/18
[52] U.S. Cl. ................................................................. 35/19 A
[58] Field of Search ........................... 35/18 A, 19 A; 339/18 R

[56] References Cited

U.S. PATENT DOCUMENTS

| 3,093,431 | 6/1963 | Lewis | 35/19 A X |
| 3,324,572 | 6/1967 | Robarge | 35/19 A |
| 3,374,556 | 3/1968 | Brown | 35/19 A |
| 3,564,480 | 2/1971 | Dziubaty | 35/19 A X |

FOREIGN PATENT DOCUMENTS 755358  8/1956  United Kingdom ................... 35/19 A

OTHER PUBLICATIONS

"Pipet Color Codes", p. 804 of Fisher Scientific Co. Catalog for 1965.
Welch Scientific Co. Catalog "Connectors and Connections", pp. 248, 249.
"Erectronic System" Various Ads and 1957 Radio-Electronics Mag. Cover.

*Primary Examiner*—Harland S. Skogquist

[57] ABSTRACT

The Universal Electrical Construction Set consists of a coded series of plastic spring-bearing disks called "connectors", used for temporary attachment and support of electrical circuit components, plus a set of hook-up wires with coded lengths, used for linking the connectors together in appropriate ways to complete the electrical circuit construction; two additional types of devices, adaptors and indicators, make the set complete. These devices can be temporarily attached, when and where desired, to the springs of the connectors. The "adaptors" allow the utilization of circuit components having short leads. The "indicators" provide a convenient, optional coding system to indicate numbers or relative electrical potentials. The color, diameter, and geometry of construction of each disk are related to the number of springs supported by it. The same color-coding system, namely the resistor color code, is used for connectors, hook-up wires, and indicators.

1 Claim, 5 Drawing Figures

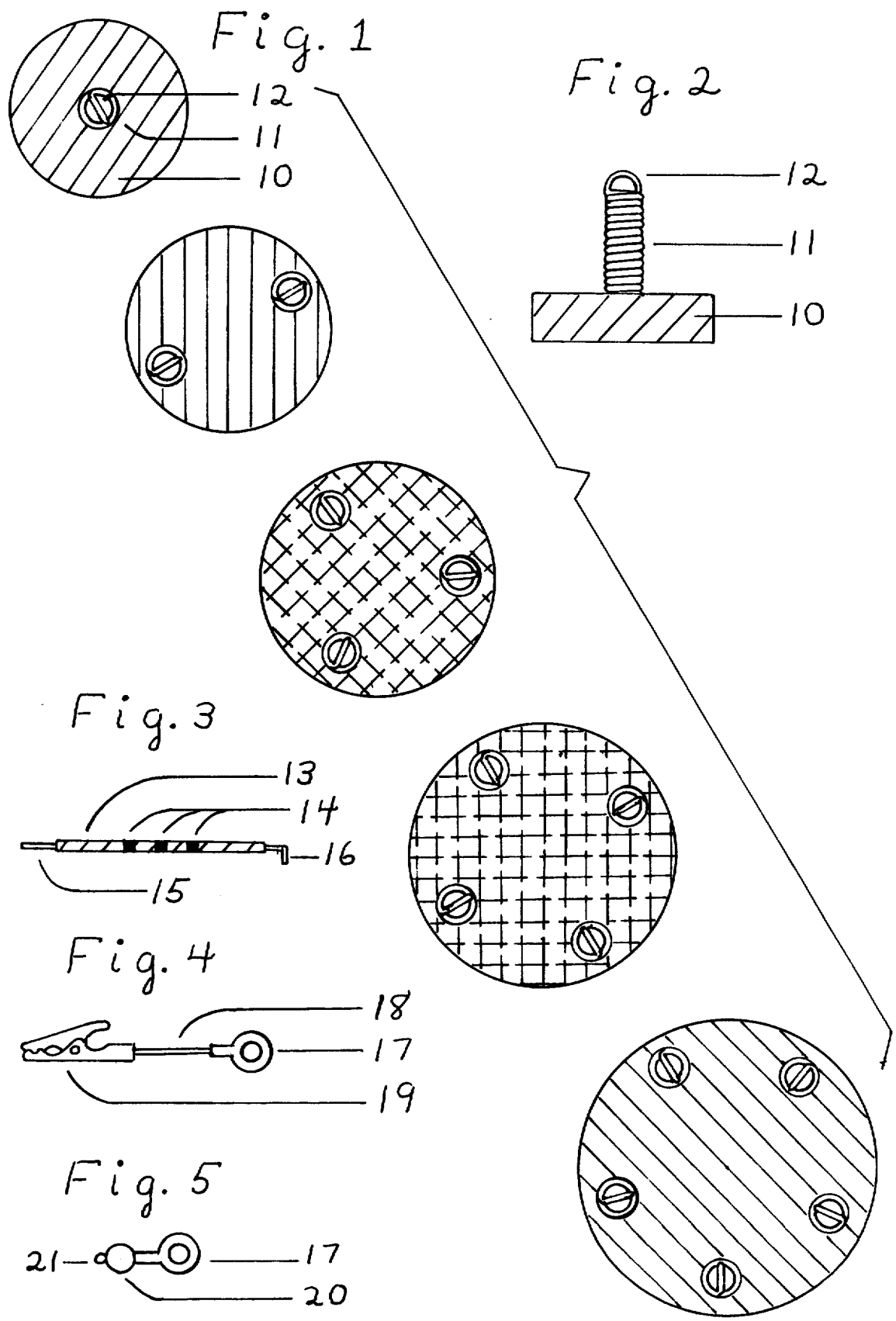

UNIVERSAL ELECTRICAL CONSTRUCTION SET

THE DESCRIPTION

Reference is made herein to the following figures:

FIG. 1 is a top-view of the first five members of a series of spring-bearing, color-coded plastic disks, herein designated as "connectors", each of which is hatched in the diagram to indicate the color that is associated with it (in accordance with the hatching system prescribed by The Code of Federal Regulations).

FIG. 2 is a side-view of the first member of the connector series shown in FIG. 1.

FIG. 3 shows a sample hook-up wire whose insulation color and number of bands (the maximum of three is shown) depend upon the length of the wire.

FIG. 4 shows an adaptor.

FIG. 5 shows an indicator.

The first member of a series of spring-bearing devices, called "connectors", and which is shown in FIGS. 1 and 2, consists of a cylindrical plastic disk (10) which is ⅜" in height, and 1½" in diameter, plus a single spring (11) which is partially imbedded in the plastic disk at its center, in such manner that the spring is permanently supported with its axis in a vertical position, and to such depth in the plastic that the spring is electrically insulated from the supporting surface for the connector. The disk is brown in color, as is indicated by the slanted hatch lines. The second member of the connector series, shown in FIG. 1, consists of a cylindrical disk of the same height as the first member but of a larger diameter, namely 1 and ¾", plus 2 springs permanently attached to it, in the manner described, near opposite ends of a diameter of the disk. The disk is red in color, as is indicated by the vertical hatch lines. The third member of the series is an orange-colored disk of the same height but still larger diameter, namely 2". It bears 3 springs, mounted in such manner that one is at each of the corners of an equilateral triangle. Only the first 5 members of the series are shown in FIG. 1. The colors, diameters, and geometries of construction of higher members of the series can be readily deduced from the diagram plus the description. In color, all of the disks conform to the resistor color code: brown for 1, red for 2, orange for 3, yellow for 4, green for 5, blue for 6, violet for 7, grey for 8, and white for 9. The diameters of the connectors increase by increments of ¼" in proceeding upward through the series. Specifically, for $n = 1, 2, 3$, and so on, up to and including 9, and possibly 10, the diameter of the nth disk in inches is given by: $d(n) = \frac{1}{4}(n+5)$. The springs are situated on each disk at the corners of the regular polygon (equilateral triangle, square, pentagon, hexagon, etc.) to which the number of springs corresponds. On each of the connectors above the first, the outer edges of the springs are ⅛" from the edge of the disk. The springs employed in making the connectors are those which are commercially designated as #178. (There are 3 versions of this spring, 178A, 178B, and 178C. The longest one, the C version, was used in making prototype connectors; each spring was cut in half prior to use in building the connectors). Their diameter is approximately 5/16", and the height of the body of each spring above the surface of a connector is 7/8", or thereabout. That would most probably be considered as the maximum height above the connector surface for the springs of the mass-produced devices. These springs were specially selected because their size and degree of tension makes them easy to manipulate. The vertical loop (12) at the top end of each supported spring is retained to facilitate manipulation of the spring. The loops also serve for the attachment of alligator clips, as for example, those attached to leads coming from devices monitoring a circuit's operation. The maximum height mentioned refers only to the body of the spring, that is, it does not include the loop. When mass-produced, the disks will be made of Celcon and will be injection-molded, unless another material &/or method is found to be more desirable.

The connectors are intended for use in the temporary construction of electrical circuits. This is accomplished by inserting component leads and the ends of hook-up wires, such as 16 of FIG. 3, between the turns of the springs. Entire circuits, differing in size and variety of components, can be constructed using only the first member of the series. However, as the circuits increase in size and variety of components, it becomes more convenient to employ, for each component, a connector whose number of springs corresponds to the number of leads of the component. For example, circuit components like resistors, capacitors, and diodes, which have 2 leads, can be readily mounted in a temporary way on the red connectors. Transistors can be accommodated by the orange connectors. Circuit components having larger numbers of leads, including vacuum-tube sockets with leads attached, can be readily accommodated by connectors having correspondingly larger numbers of springs. With circuit components attached to them, the connectors can be easily shifted around on a plane surface and placed into convenient positions relative to one another. To complete the construction of any particular circuit, the various connectors supporting the components of the circuit are linked together, in accordance with the plan of the circuit, by hook-up wires which extend between the appropriate springs of connectors that are to be electrically joined. For the latter purpose, a complete set of wires of assorted sizes is utilized.

In the set of hook-up wires, the 1" wires have brown insulation, the 2" wires have red insulation, and so on, in accordance with the resistor color code. They are single-stranded wires, 20 gauge, or thereabout. The wire lengths vary, though, in increments of ¼" from 1" to 9 and ¾". A 1 and ¾" hook-up wire is shown in FIG. 3. Wires having lengths of 1¼, 1½, and 1 & ¾" have brown insulation, but the insulation (13) is centrally marked with, respectively, 1, 2, and 3 black bands (14) which encircle the wire. Each band corresponds to an additional ¼" over 1". There is a total of 36 different wire lengths in the basic set, with the same banding system used throughout. To complete the set of hook-up wires, there are several representatives of each length. The color-coding system gives the length of wire covered by insulation. A short length of uninsulated wire (15) protrudes from the insulation at each end. Right-angle bends can be made within the uninsulated sections, as shown at 16, so that when the ends of the wires are inserted between the turns of the connector springs, they will not slip out. With the bent ends of wires inserted between the turns of the springs, the length of wire extending between adjoining springs will be essentially equal to that which is indicated by the coding system. Optionally, solder-lugs (17) having the same diameter as the springs can be attached to the ends of the wires. The uninsulated length of wire (15) at each end is just sufficient to accommodate a solder-lug. Since the washer-like lugs slip readily between the turns of the springs, the assembly and disassembly of circuits can thereby be facilitated.

The members of the connector series thus far described, namely 1 through 9, can, collectively, accommodate a wide variety of electrical circuit components. However, there are some circuit elements, such as "integrated circuits", which cannot be accommodated due to their large number of leads. Accordingly, connectors still higher in the series are contemplated for future construction. Beginning at 10 or 11, the connectors will have smaller springs. With the introduction of smaller springs, the diameter of the 10th or 11th disk will be reduced accordingly, but the diameters of successive disks will increase again by regular increments. Whatever the spring size for 10, the disk will be black, again in accordance with the resistor color code wherein black represents zero. At this point the code represents 10 plus 0. In like manner, brown represents 11, red 12, and so on through 19. Thus, for 10 through 19, the number of springs on a disk is 10 plus the number corresponding to the color of the disk. The series can be extended even farther as needed, according to the same plan, and with or without a further reduction in spring size.

The hook-up wire lengths will also be extended as required. 10" wires will have black insulation, and white bands around the black insulation will be used for wires having lengths of 10¼, 10½, and 10 & ¾". 11" wires will be brown; 12" wires will be red; and so on. Thus, for 10 through 19, the wire length in inches is 10 plus the number corresponding to the insulation color. And as before, beginning with 11¼", black bands will be used to represent ¼" increments.

As determined through use, the size of the connectors is generally both sufficient and convenient for accommodating circuit components. In those instances where it is not, re-orienting a component with appropriate bends in its leads will usually enable it to be attached to the connector. If necessary, the component can be placed alongside the connector. Such might be the case, for example, with an ammeter, which is generally too large to fit on a red disk. Some components, such as parts salvaged from assembled printed-circuit boards, have very short leads, too short to effect contact with the connector springs. In this instance, simple devices designated as "adaptors", as shown in FIG. 4, can be readily employed. Each one consists of a short piece of wire (18) with a solder-lug (17) attached to one end and an alligator clip (19), the smallest available, attached to the other end. The solder-lug (17) slips between the turns of a spring (11) and the clip (19) holds onto a lead of a circuit component. A more durable and flexible variation of the above is contemplated which employs a slender spring in place of the short segment of wire.

In those instances wherein it is desirable to associate a number with each of a component's leads, a means is provided for doing so in the form of simple devices called "indicators"; one is shown in FIG. 5. Each indicator consists essentially of a solder-lug (17) and a colored bead (20) in combination. A truncated section of a straight-pin, with head attached, extends through the bead (20) to the lug (17), to which it is permanently attached. The head of the pin (21) prevents the bead from slipping off. The colors of the beads range through the resistor color code and represent the corresponding numbers. A solder-lug, with bead attached, can slip readily between the turns of a spring. Thus, any spring of any connector can temporarily have associated with it any number that one desires to associate with it. The numbers can correspond to those associated with component leads, as for example, pin numbers of a vacuum-tube. And where it is desirable to distinguish between individual components by number, such as C1, C2, C3, etc., the indicators can be readily employed. Furthermore, where it is desirable to indicate that a given point is at a positive electrical potential relative to some other point, an indicator with a red bead can be readily employed. An indicator with a black bead can be associated with the point having the negative electrical potential. The indicator colors can represent whatever one wants them to represent.

The connectors and hook-up wires, in basic plus extended forms, plus the adaptors and indicators, constitute a Universal Electrical Construction Set. It is universal in that it can accommodate virtually any electrical circuit components, and can employ any desired numbering systems, and universal in that the number of different circuits which can be constructed is virtually infinite. The usefulness of the Universal Electrical Construction Set in practice is limited only by the unfeasability of constructing circuits which become overwhelming in size. The ingredients of the Universal Electrical Construction Set will be employed in educational kits, which will also include, in each case, a copyrighted instruction book, or booklet. The first of these kits, which is entitled "The Electrical Star", will employ the simplest usable assortment of ingredients of the Universal Electrical Construction Set, namely a set of the brown single-spring connectors and hook-up wires. The latter, however, may be supplied as a single wire, of variable or herein unspecified length, or separate wires, also of variable or herein unspecified lengths, which can be cut into shorter, measured lengths as appropriate for the insulation colors. Bands may be supplied which can be peeled away from a supportive backing and wrapped around the wires. Even a small length of friction tape, which can be cut into narrow strips, could be supplied for this purpose. The object is to get this first kit together as economically as possible. With financial growth and increasing sophistication of the circuitry of subsequent kits, broader assortments of the ingredients of the Universal Electrical Construction Set will be employed, with selected quantities of the various ingredients as deemed appropriate for each kit. All of the components of the Universal Electrical Construction Set will also be made available on an individual, or selectively-packaged basis, apart from their inclusion in educational kits, as it is found to be desirable to do so.

The connectors possess, or have associated with them, a combination of qualities, or properties, which both suit them to their intended purpose and distinguish them from related products already available on the market. The connectors are durable, in that they are not readily breakable. They are insulative, and can be safely used with a.c. accommodations available in the home. They are supportive in that they actually hold onto the circuit components as well as providing a means of making electrical connections between them. By the nature of the springs, they are retentive, to greater or lesser degrees depending upon the type of connection made, and they are easy to work with. The connectors are conservative; they can be used repeatedly in temporarily constructing electrical circuits for study, experiment, demonstration, or whatever, and thereby conserve time, energy, and materials. They are also conservative in that they allow, in conjunction with the adaptors, the use of functional salvaged parts which might otherwise be discarded due to their possession of short leads. The connectors are versatile. For example, the brown connectors of the basic set can be readily employed to link together hook-up wires where long connections are necessary. The red connectors with 2 springs can be employed as switches, and also provide a convenient means of making parallel connections, as by placing one resistor above another. The orange connectors with 3 springs allow two devices, such as resistors, to be connected in series. The yellow connectors with 4 springs provide a means of making a bridge-rectifier by arranging 4 diodes in a square with a spring at each corner. In addition, they all permit easy attachment of monitoring devices, such as a voltmeter or oscilloscope, since leads bearing alligator clips can be readily attached to the loops of the springs, and to the bodies of the springs as well. By way of summary thus far, the connectors are durable, insulative, supportive, retentive, easy to work with, conservative, and versatile. In addition, they are simple, colorful, freely-movable, of convenient size, and as previously seen, they are universal. Their combination of qualities enables the easy construction of circuits which are neat, attractive, and easier to follow through than those constructed by the usual or what might be called "conventional methods".

The idea of using springs for making temporary electrical connections is not new, and accordingly, patent rights are not being sought on this idea as such. Of greater importance is the manner in which the springs are provided for use, that is, what they are in conjunction with and what the special features of structure and function are which arise from that conjunction. There are spring-containing devices which can be attached to bread-boards, or peg-boards, and hence, are not freely-movable. Bread-boards are generally made with holes arranged in the manner suggestive of a rectangular coordinate system. But there are circuits which can be better and more-meaningfully constructed within a polar coordinate system instead. With my Universal Electrical Construction Set, which employs freely-movable connectors, one can construct on a continuous smooth surface one part of a circuit that is built within a rectangular coordinate system and another part of the same circuit that is built within a polar coordinate system. No other device or system patented to this date, that is concerned with temporary electrical circuit construction can do this neatly, nor does any patent contain any mention to this effect. Thus, my Universal Electrical Construction Set possesses a versatility that is not possessed by any of the others. In developing my series of connectors I have produced bases which have maximum weight for the overall volume that they occupy since they are solid cylinders, and I have endeavored to find the best base-shape, since base-weight and shape are necessarily involved in any consideration of the possibility that a connector will tip over either when accidentally bumped or when a tipping leverage is placed on the connectors in connecting things to the springs. Consider the following example involving a comparison of different base shapes. Suppose you have two single-spring connectors that have the same height and same volume (and hence are made from the same amounts of raw material) but which have different base shapes, say a square cylinder and a circular cylinder, and each has a centrally-located spring. Now suppose that you apply a tipping leverage to each. With the circular cylinder the direction in which the leverage is applied is inconsequential because the possibility of tipping would be the same in all directions for the same amounts of leverage. But with the square-cylinder base the possibility of tipping is not the same in all directions. The greatest possibility of tipping would be in a direction perpendicular to any one of its sides, so leverage would be applied in one of those directions, here considered to be comparable to the weakest links in a chain. Now if leverage is increased simultaneously and equally on both connectors, the connector whose base is a square cylinder will tip first, as can be seen by simple mathematical consideration of the geometry of the bases. So, from the functional point of view, a circular cylinder is more desirable. And for aesthetic reasons, I have considered the use of the circular-cylinder base shape throughout the connector series to be more desirable than any variation in base shape. It is simply more desirable to have uniformity in shape throughout the series, and since the first base should be a circular cylinder for the attainment of optimum stability, then the others should be circular cylinders too. It is also aesthetically-pleasing to have bases whose diameters grow by regular increments and to have different bases distinguishable by different colors in correspondence with their diameters and the number of springs which they support, and in accordance with a color-code that is well-established in the field of electronics. In bringing my connectors slowly to the point of full development, I have neither pasted nor inscribed anything on any of the bases, such as a schematic symbol for some particular circuit component, thus leaving all of the connectors open for use with any electrical circuit components, or combinations thereof as desired, thereby maintaining their universality. Other devices used for making temporary electrical connections may possess some of the features possessed by my connectors, or associated with them, but there are none which possess all of their features. There is no other construction set which starts with a single-spring connector and proceeds upwards through a color-coded series of connectors, nor is there any other construction set which uses hook-up wires whose lengths are distinguishable by a coding system that is a combination of color and banding, nor is there any other construction set which uses adaptors and indicators as specifically described herein.

On the basis of the above description, an my own conviction concerning the uniqueness of my material, I present my claims:

I claim:

1. A Universal Electrical Construction Set consisting of connectors, hook-up wires, adaptors, and indicators, the connectors being a series of spring-bearing disks, the diameter and color of which correlate with the number of springs supported, in such manner that the diameter in inches of the nth disk is given by $d(n) = \frac{1}{4}(n+5)$ for n ranging from 1 to 9 or 10, and in such manner that the disk colors correlate with the number of springs supported, conforming colorwise and numberwise with the well-established resistor color code, and in such manner that the springs are arranged in the most symmetric way for the number that are supported by any given disk, and the primary purpose of which is to provide both a means for attachment generally accompanied by support for electrical circuit components and a means for attachment of hook-up wires that extend between circuit components, the hook-up wires being a set of wires with different lengths such that the lengths grow by $\frac{1}{4}''$ increments beginning at 1", coded in such manner that the insulation color for any wire indicates the highest whole number of inches of insulated wire, in accordance with the resistor color code, and in such manner that each additional ¼" of insulated wire above the highest whole number of inches is indicated by a band around the wire, to a maximum of 3 bands, the adaptors being accommodative, go-between devices, each of which consists of a solder-lug and an alligator-clip with a short bendable wire or spring extending between them, and each of which extends when needed between a spring of a connector and a lead or pin of a circuit component thus serving as a means for accommodating otherwise unattachable components, the indicators being a series of colored beads each of which has permanently associated with it a solder-lug for attachment of the bead to the spring of a connector thereby serving as a means for associating with any spring of any connector a number or whatever that is arbitrarily associated with the color of the bead, the colors employed again being those of the resistor color code.

* * * * *